(12) United States Patent
Taniguchi

(10) Patent No.: US 9,929,629 B2
(45) Date of Patent: Mar. 27, 2018

(54) ROTATING ELECTRICAL MACHINE

(71) Applicant: DENSO CORPORATION, Kariya, Aichi-pref. (JP)

(72) Inventor: Makoto Taniguchi, Obu (JP)

(73) Assignee: DENSO CORPORATION, Kariya (JP)

( * ) Notice: Subject to any disclaimer, the term of this patent is extended or adjusted under 35 U.S.C. 154(b) by 78 days.

(21) Appl. No.: 15/297,734

(22) Filed: Oct. 19, 2016

(65) Prior Publication Data

US 2017/0040876 A1 Feb. 9, 2017

Related U.S. Application Data

(63) Continuation of application No. 13/935,715, filed on Jul. 5, 2013, now abandoned.

(30) Foreign Application Priority Data

Jul. 9, 2012 (JP) ................................ 2012-153596

(51) Int. Cl.
*H02K 15/06* (2006.01)
*H02K 15/02* (2006.01)
(Continued)

(52) U.S. Cl.
CPC ......... *H02K 15/0435* (2013.01); *H02K 1/146* (2013.01); *H02K 1/2706* (2013.01);
(Continued)

(58) Field of Classification Search
CPC .. H02K 15/0435; H02K 11/215; H02K 29/08; H02K 2213/03; H02K 15/02;
(Continued)

(56) References Cited

U.S. PATENT DOCUMENTS

| 4,968,921 A | 11/1990 | Giardini |
| 5,397,951 A | 3/1995 | Uchida et al. |

(Continued)

FOREIGN PATENT DOCUMENTS

| CN | 102035319 A | 4/2011 |
| JP | 01-180855 | 12/1989 |

(Continued)

OTHER PUBLICATIONS

Apr. 22, 2014 Office Action issued in Japanese Appln. No. 2012-153596 (with English translation).
(Continued)

*Primary Examiner* — Michael Andrews
*Assistant Examiner* — Noli Manaloto
(74) *Attorney, Agent, or Firm* — Nixon & Vanderhye P.C.

(57) ABSTRACT

A rotating electrical machine includes a supporting member, a stator core, a winding set, a shaft, a rotor, a magnetic generator, and a magnetic detector. The stator core has a ring-shaped yoke held inside the supporting member and tooth portions projecting from the yoke in a radial inward direction of the yoke. The winding set is wound on the tooth portions. The shaft extends through the stator core and is rotatably supported by the supporting member. The rotor is located in the stator core and rotates with the shaft. The magnetic generator is located at an end of the shaft. The magnetic detector outputs a signal indicative of a change in magnetic flux density created by the magnetic generator. The number of the tooth portions for every magnetic pole pair in the rotor is even.

13 Claims, 9 Drawing Sheets

(51) Int. Cl.
| | |
|---|---|
| *H02K 15/08* | (2006.01) |
| *H02K 15/04* | (2006.01) |
| *H02K 21/16* | (2006.01) |
| *H02K 29/08* | (2006.01) |
| *H02K 11/215* | (2016.01) |
| *H02K 11/38* | (2016.01) |
| *H02K 1/14* | (2006.01) |
| *H02K 3/18* | (2006.01) |
| *H02K 7/08* | (2006.01) |
| *H02K 1/27* | (2006.01) |

(52) U.S. Cl.
CPC .............. *H02K 3/18* (2013.01); *H02K 7/083* (2013.01); *H02K 11/215* (2016.01); *H02K 11/38* (2016.01); *H02K 15/02* (2013.01); *H02K 15/026* (2013.01); *H02K 15/06* (2013.01); *H02K 15/08* (2013.01); *H02K 21/16* (2013.01); *H02K 29/08* (2013.01); *H02K 1/278* (2013.01); *H02K 2213/03* (2013.01); *Y10T 29/49009* (2015.01); *Y10T 29/49012* (2015.01)

(58) Field of Classification Search
CPC ........ H02K 15/06; H02K 29/06; H02K 29/14; H02K 15/026; H02K 15/08; H02K 11/38; H02K 1/146; H02K 1/2706; H02K 3/18; H02K 27/083; H02K 21/16; H02K 1/278; Y10T 29/4009; Y10T 29/49012; Y10T 29/49009

USPC ........................... 310/68 B; 318/560; 29/596
See application file for complete search history.

(56) References Cited

U.S. PATENT DOCUMENTS

| | | | |
|---|---|---|---|
| 5,982,067 A | | 11/1999 | Sebastian et al. |
| 6,060,809 A | * | 5/2000 | Pengov ................ H02K 19/103 310/168 |
| 6,310,455 B1 | * | 10/2001 | Siraky ................... H02K 11/33 310/80 |
| 7,942,651 B2 | | 5/2011 | Bin-Nun et al. |
| 2009/0033180 A1 | * | 2/2009 | Abe ....................... H02K 11/21 310/68 B |
| 2010/0148612 A1 | | 6/2010 | Takemoto et al. |
| 2011/0074243 A1 | * | 3/2011 | Liang .................... H02K 1/165 310/216.112 |

FOREIGN PATENT DOCUMENTS

| | | |
|---|---|---|
| JP | 08-126279 | 5/1996 |
| JP | 2006-081283 | 3/2006 |
| JP | 2012-016235 | 1/2012 |

OTHER PUBLICATIONS

Hendershot et al., "Design of Brushless Permanent-Magnet Motors," Magna Physics Publishing and Clarendon Press, Oxford, 1994, pp. 3-10 & 3-13.

* cited by examiner

ROTATING ELECTRICAL MACHINE

CROSS REFERENCE TO RELATED APPLICATION

This application is a continuation application of application Ser. No. 13/935,715, filed Jul. 5, 2013, and is based on Japanese Patent Application No. 2012-153596 filed on Jul. 9, 2012, the disclosures of each of which are incorporated herein by reference.

FIELD

The present disclosure relates to a rotating electrical machine.

BACKGROUND

In the field of rotating electrical machines, it is known that a semiconductor magnetic sensor is used to detect a relative rotation angle of a rotor with respect to a stator. In this case, a secondary magnet is placed at a position corresponding to the semiconductor magnetic sensor. For example, in a brushless motor disclosed in JP-A-2006-081283, a secondary magnet is placed at an end of a shaft rotating with a rotor so that a semiconductor magnetic sensor can detect a relative rotation angle of the rotor without the influence of a magnetic field which is caused by electric current in a winding and a magnetic pole of the rotor.

SUMMARY

A position of a secondary magnet with respect to a magnetic pole is important when a relative rotation angle of a rotor with respect to a stator is detected by using a semiconductor magnetic sensor. It is noted that a relative rotation angle of a rotor with respect to a stator is hereinafter sometimes referred to as the "rotational position of a rotor". In a stator where a slot is positioned at an electrical angle $\pi$ (i.e., 180°) with respect to a tooth portion, a magnetic flux generated in the tooth portion is distributed at the slot. Accordingly, a magnetic field is weakened, and force of a rotor to attract a magnetic pole is reduced. Therefore, the rotor may rotate upon application of accidental external force when a secondary magnet is fixed to a rotor. If this occurs, the secondary magnet is not fixed in a correct position with respect to a magnetic pole. As a result, a rotational position of a rotor is not accurately detected by using a semiconductor magnetic sensor.

In view of the above, it is an object of the present disclosure to provide a rotating electrical machine in which a rotational position of a rotor is detected with an improved accuracy.

According to an aspect of the present disclosure, a rotating electrical machine includes a supporting member, a stator core, a winding set, a shaft, a rotor, a magnetic generator, and a magnetic detector. The stator core has a ring-shaped yoke held inside the supporting member and tooth portions projecting from the yoke in a radial inward direction of the yoke. The winding set is wound on the tooth portions. The shaft extends through the stator core and is rotatably supported by the supporting member. The rotor is located in the stator core and rotates with the shaft. The magnetic generator is located at an end of the shaft. The magnetic detector outputs a signal indicative of a change in magnetic flux density created by the magnetic generator. The number of the tooth portions for every magnetic pole pair in the rotor is even.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present disclosure are described below with reference to the drawings.

(First Embodiment)

Figure 1:
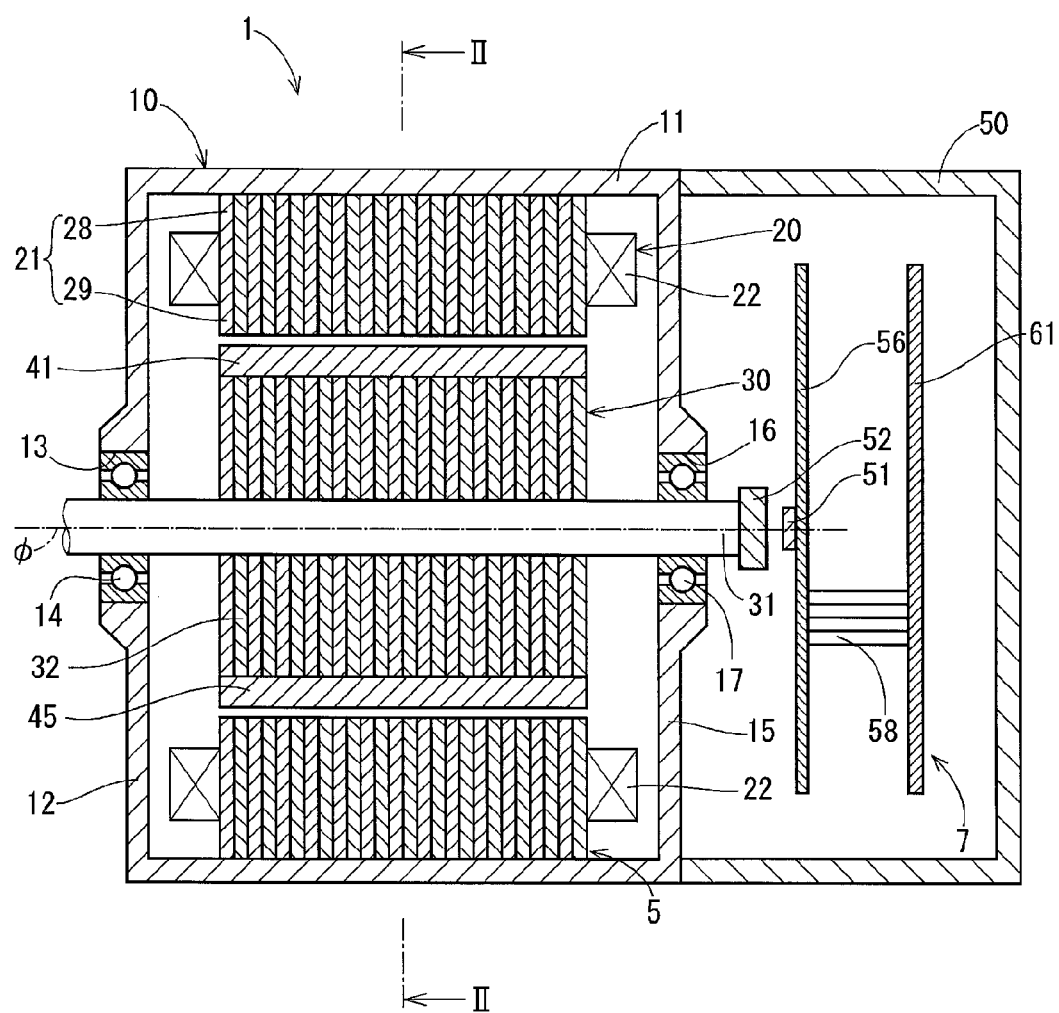
FIG. 1 is a diagram illustrating a cross-sectional view, taken along line I-I in FIG. 2, of a rotating electrical machine according to a first embodiment of the present disclosure.
Figure 2:
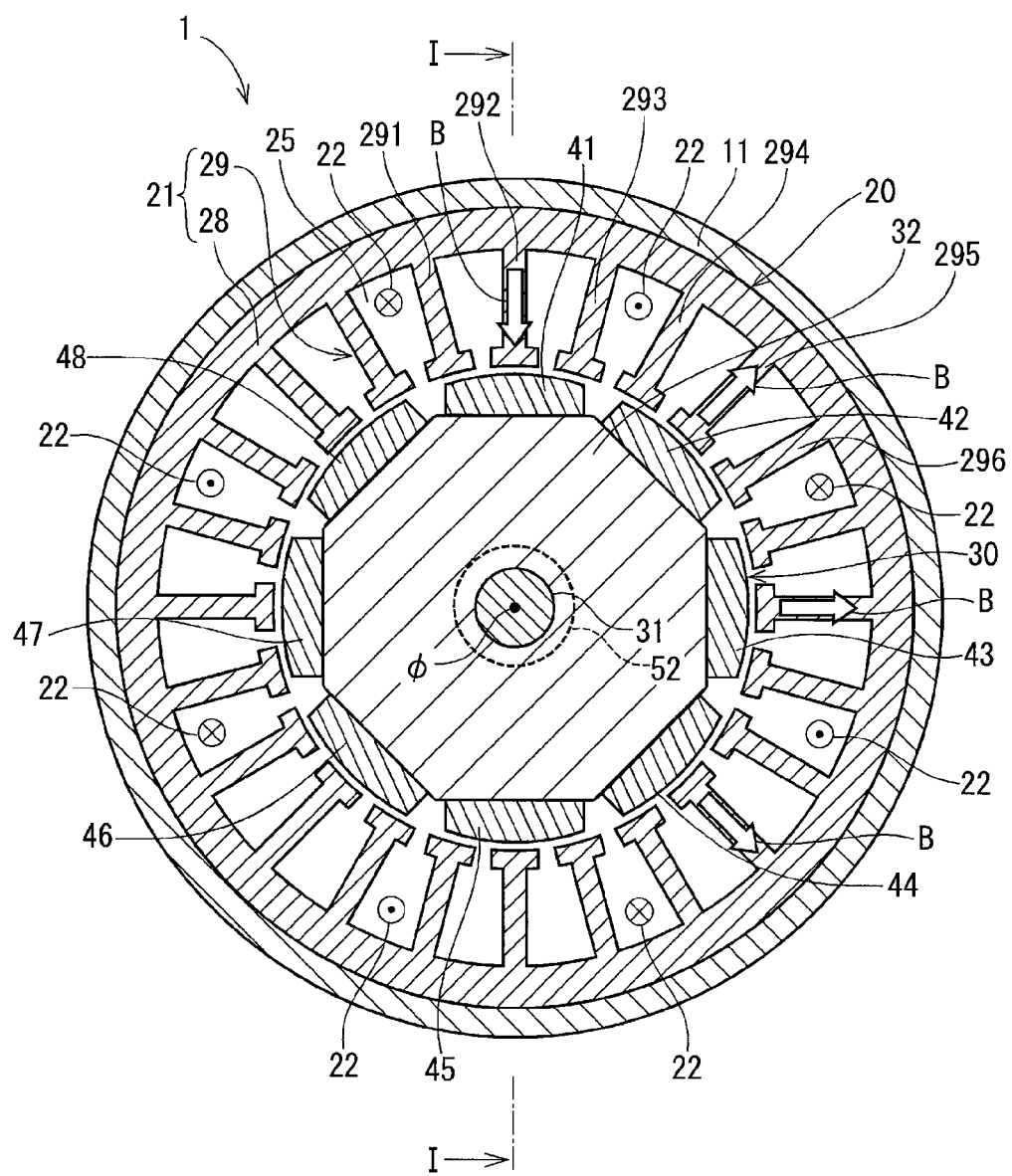
FIG. 2 is a diagram illustrating a cross-sectional view taken along line II-II in FIG. 1.

A rotating electrical machine 1 according to a first embodiment of the present disclosure is described below with reference to FIGS. 1, 2, and 3. As shown in FIG. 1, the rotating electrical machine 1 includes a motor 5 and a controller 7.

The motor 5 is a three-phase brushless motor. The motor 5 includes a first housing 10 (as a supporting member), a stator 20, and a rotor 30.

The first housing 10 includes a tube 11, a first side portion 12, and a second side portion 15. A first end of the tube 11 is closed with the first side portion 12. A second end of the tube 11 is closed with the second side portion 15. A bearing 14 is fitted in a through hole 13 in the center of the first side portion 12. A bearing 17 is fitted in a through hole 16 in the center of the second side portion 15.

The stator 20 includes a stator core 21 and a winding set 22. The stator core 21 is located in the tube 11 of the first housing 10. The winding set 22 is wound on the stator core 21.

The stator core 21 has a ring-shaped yoke 28 and tooth portions 29. The yoke 28 is pressed into the tube 11 so that the yoke 28 can be pressed against and fixed to an inner surface of the tube 11. The tooth portions 29 project from the yoke 28 in a radial inward direction of the yoke 28. The yoke 28 and the tooth portions 29 are formed as a single piece. According to the first embodiment, twenty-four tooth portions 29 are arranged at an interval of 15 degrees in a circumferential direction of the yoke 28.

The winding set 22 includes a U-phase winding, a V-phase winding, and a W-phase winding. A slot 25 is formed between adjacent tooth portions 29. Each winding of the winding set 22 is wound in every third slot 25. That is, each winding of the winding set 22 is wound at intervals of three slots 25. In other words, each winding of the winding set 22 is wound at intervals of three tooth portions 29. The three tooth portions 29 providing each interval are positioned to face one primary magnet of the rotor 30. Thus, each winding of the winding set 22 is wound on the tooth portions 29 at intervals of an electrical angle of $\pi$ (i.e., 180°). It is noted that FIG. 2 shows a direction of an electric current flowing through the U-phase winding only.

The rotor 30 includes a rotor core 32 and primary magnets 41, 42, 43, 44, 45, 46, 47, and 48.

The rotor core 32 is made of steel plates that are laminated in a direction of a rotation axis $\Phi$. Each steel plate is made from soft magnetic material. The primary magnets 41, 42, 43, 44, 45, 46, 47, and 48 are located on the outside of the rotor core 32 in a radial direction of the rotor core 32. The rotor core 32 serves as a yoke for conducting a magnetic flux expelled from the primary magnets 41, 42, 43, 44, 45, 46, 47, and 48.

Eight magnetic poles are provided by the primary magnets 41, 42, 43, 44, 45, 46, 47, and 48 to surround the outside of the rotor core 32 in the radial direction of the rotor core 32. According to the first embodiment, each of the primary magnets 41, 43, 45, and 47 forms a south pole at the rotor core 32, and each of the primary magnets 42, 44, 46, and 48 forms a north pole at the rotor core 32. In the rotating electrical machine 1, sixth tooth portions 29 are provided for every magnetic pole pair of different types of magnetic poles. That is, three tooth portions 29 are provided for each of the primary magnets 41, 42, 43, 44, 45, 46, 47, and 48. Specifically, when the rotor 30 is in a position shown in FIG. 2, while tooth portions 291, 292, and 293 are positioned to face the primary magnet 41, tooth portions 294, 295, and 296 are positioned to face the primary magnet 42. It is noted that the tooth portions 291-296 are part of the tooth portions 29. Since the motor 5 is a three-phase brushless motor, and the rotor 30 has eight poles, the product of the number of poles and the number of phases is twenty-four. Further, since the number of tooth portions 29 is twenty-four, a number k defined as the number of tooth portions 29 for every magnetic pole and every phase is one (=24/24).

A shaft 31 is inserted in a through hole formed in the center of the rotor core 32. The shaft 31 is rotatably supported by the bearings 14 and 17.

A second magnet 52 (as a magnetic generator) is fixed to the shaft 31 in such a manner that the second magnet 52 can generate a magnetic flux perpendicular to an axis direction of the shaft 31. Specifically, the secondary magnet 52 is held in a casing (not shown), and the casing is pressed fitted to an end of the shaft 31 on the second side portion 15 side. Thus, the secondary magnet 52 is fixed to the end of the shaft 31.

The controller 7 is connected to the motor 5 on the second side portion 15 side. The controller 7 includes a second housing 50, a magnetic sensor 51 (as a magnetic detector), a signal board 56 (as a processor), a power board 61 (as an energization controller), and a connector 58 for connecting the signal board 56 and the power board 61. The magnetic sensor 51, the signal board 56, the power board 61, and the connector 58 are accommodated in space defined by the second housing 50 and the second side portion 15.

The magnetic sensor 51 is located to face the secondary magnet 52 in the axis direction of the shaft 31. The magnetic sensor 51 has a magnetoresistive (MR) element and detects a magnetic field parallel to the magnetic sensor 51. The magnetic sensor 51 has a magnetic detection surface and outputs a signal, indicative of a change in magnetic flux density on the magnetic detection surface, to the signal board 56.

The signal board 56 calculates a relative rotation angle of the rotor 30 with respect to the stator 20 based on the signal outputted from the magnetic sensor 51. The signal board 56 outputs a signal, indicative of the calculated relative rotation angle, to the power substrate 61 through the connector 58.

Figure 3:
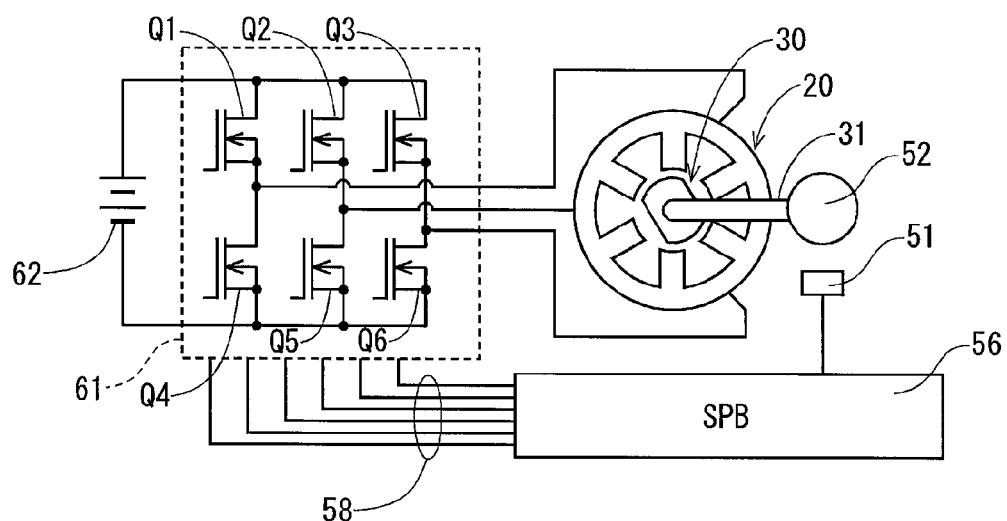
FIG. 3 is a diagram illustrating an electrical configuration of the rotating electrical machine according to the first embodiment.

As shown in FIG. 3, the power board 61 includes power transistors Q1, Q2, Q3, Q4, Q5, and Q6. The power board 61 controls the power transistors Q1, Q2, Q3, Q4, Q5, and Q6 based on the signal outputted from the signal board 56, thereby supplying electrical power of a power source 62 to the winding set 22. Thus, the stator 20 generates a magnetic field rotating in the circumferential direction, and the rotor 30 rotates according to the magnetic field.

According to the first embodiment, as mentioned previously, sixth tooth portions 29 are provided for every magnetic pole pair. That is, the rotating electrical machine 1 according to the first embodiment is characterized in that the number of tooth portions 29 for every magnetic pole pair is even. A difference between when the number of tooth portions for every magnetic pole pair is even and when the number of tooth portions for every magnetic pole pair is odd is described below with reference to FIGS. 4A and 4B.

Figure 4A:
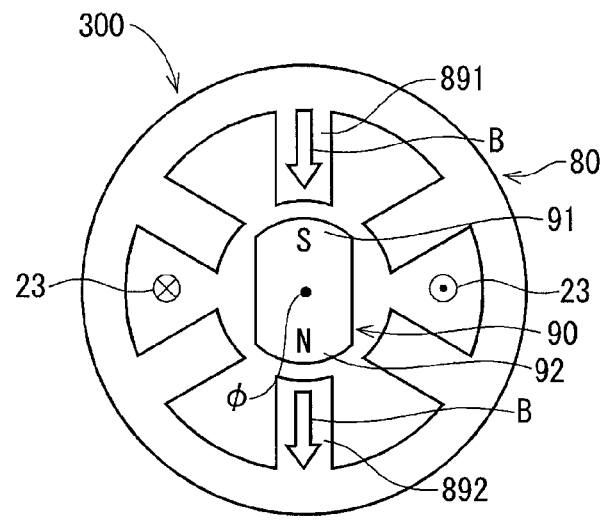
FIG. 4A is a diagram illustrating a cross-sectional view of a rotating electrical machine, as a reference example, in which the number of tooth portions for every magnetic pole pair is even.
Figure 4B:
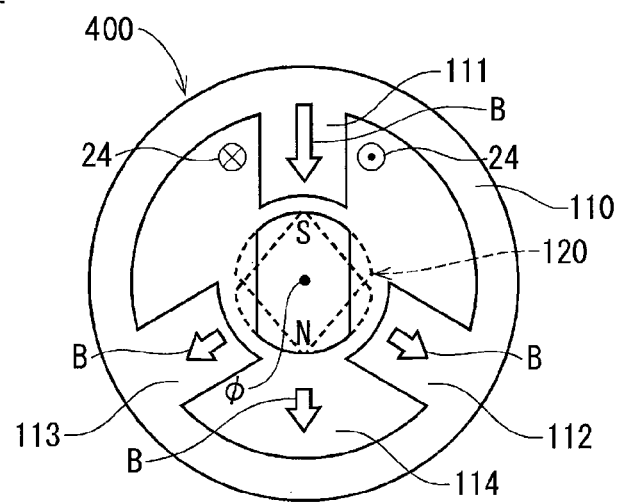
FIG. 4B is a diagram illustrating a cross-sectional view of a rotating electrical machine, as a reference example, in which the number of tooth portions for every magnetic pole pair is odd.

FIG. 4A is a diagram illustrating a cross-sectional view of a rotating electrical machine 300, as a reference example, in which the number of tooth portions for every magnetic pole pair is two, i.e., even, and FIG. 4B is a diagram illustrating a cross-sectional view of a rotating electrical machine 400, as a reference example, in which the number of tooth portions for every magnetic pole pair is one, i.e., odd.

In the rotating electrical machine 300, in which the number of tooth portions for every magnetic pole pair is two, when an electric current flows through a winding 23, a magnetic flux B from the top to the bottom of FIG. 4A is generated in a tooth portion 891 and a tooth portion 892 which is positioned at an electrical angle of $\pi$ (i.e., 180°) with respect to the tooth portion 891. In the rotating electrical machine 300, a magnetic field created by the magnetic flux B acts on a rotor 90, which is located inside a stator 80, without dispersion. Thus, attraction force of the stator 80 on primary magnets 91 and 92 is increased so that the rotor 90 can be accurately and stably positioned with respect to the stator 80 as shown in FIG. 4A.

On the other hand, in the rotating electrical machine 400, in which the number of tooth portions for every magnetic pole pair is one, when an electric current flows through a winding 24, a magnetic flux B from the top to the bottom of FIG. 4B is generated in a tooth portion 111. However, in tooth positions 112 and 113 which are not positioned at an electrical angle of $\pi$ (i.e., 180°) with respect to the tooth portion 111, the magnetic flux B is generated according to angles of the tooth positions 112 and 113 with respect to the tooth portion 111. In the rotating electrical machine 400 shown in FIG. 4B, the tooth portion 112 is positioned at an angle of 60° with respect to the tooth portion 111, and the tooth portion 113 is positioned at an angle of −60° with respect to the tooth portion 111. Therefore, it can be considered that the magnet flux B generated in a slot 114 between the tooth portion 112 and the tooth portion 113 is a half of the magnet flux B generated in the tooth portion 111. Accordingly, attraction force of a stator 110 on primary magnets of a rotor 120 is reduced. Therefore, as indicated by a broken line in FIG. 4B, even when the rotor 120 is accurately positioned with respect to the stator 110 once, the rotor 120 may be displaced with respect to the stator 110 upon application of accidental external force.

Based on the above study, advantages of the rotating electrical machine 1 according to the first embodiment is described below with reference to FIG. 2.

In the rotating electrical machine 1, the number of tooth portions 29 for every magnetic pole pair is six, i.e., even. Therefore, the rotating electrical machine 1 can have the same advantage as the rotating electrical machine 300 shown in FIG. 4A. That is, when an electric current flows though the W-phase winding of the winding set 22, the magnetic flux B is generated in the tooth portions 291, 292, and 293 in the radial inward direction so that the tooth portions 291, 292, and 293 can be magnetized, and the magnetic flux B is generated in the tooth portions 294, 295, and 296 in the radial outward direction so that the tooth portions 294, 295, and 296 can be magnetized opposite to the tooth portions 291, 292, and 293. Further, when the stator 20 and the rotor 30 have a positional relationship shown in FIG. 2, the primary magnet 41 facing the tooth portions 291, 292, and 293 is a south pole, and the primary magnet 42 facing the tooth portions 294, 295, and 296 is a north pole. Thus, the positional relationship between the stator 20 and the rotor 30 shown in FIG. 2 can be maintained even upon of application of accidental external force. The same is true for relationships between the other tooth portions and primary magnets.

When the secondary magnet 52 is fixed to the shaft 31 in assembling of the rotating electrical machine 1, the primary magnet 41 is positioned to face the tooth portion 292, and the primary magnet 42 is positioned to face the tooth portion 295 by passing an electric current through the U-phase winding. In such an approach, the secondary magnet 52 can be fixed in a correct position with respect to the primary magnets 41, 42, 43, 44, 45, 46, 47, and 48. Thus, a rotational position of the rotor 30 (i.e., a relative rotation angle of the rotor 30 with respect to the stator 20) can be accurately detected.

Further, since the secondary magnet 52 is fixed in a correct position with respect to the primary magnets 41, 42, 43, 44, 45, 46, 47, and 48, the rotor 30 can be positioned in a predetermined position by passing a small amount of an electric current through the U-phase winding. Therefore, the power board 61, which controls energization, can be reduced in size.

Further, since the secondary magnet 52 is fixed in a correct position with respect to the primary magnets 41, 42, 43, 44, 45, 46, 47, and 48, a process of adjusting detection accuracy in assembling of the rotating electrical machine 1 can be simplified. Thus, the number of man-hours required to assemble the rotating electrical machine 1 can be reduced.

In the rotating electrical machine 1, the winding set 22 is wound on the tooth portions 29 at intervals of an electrical angle of $\pi$. That is, the winding set 22 is wound on the tooth portions 29 at intervals of an electrical angle equal to or greater than $\{(2k+1)\times\pi/3k\}$, where k is the number of tooth portions 29 for every magnetic pole and every phase. In such an approach, the stator 20 generates a strong magnetic field having opposite magnetic polarity at a position of an electrical angle of $\pi$. Thus, the rotor 30 can be accurately positioned in a predetermined position. Therefore, the secondary magnet 52 can be fixed in a correct position, and the rotational position of the rotor 30 can be accurately detected accordingly.

Further, in the rotating electrical machine 1, the number of tooth portions 29 facing any one of the primary magnets 41, 42, 43, 44, 45, 46, 47, and 48 is three. That is, the number of tooth portions 29 facing any one of the primary magnets 41, 42, 43, 44, 45, 46, 47, and 48 is not less than (3k−1). In such an approach, force enough to attract the primary magnets 41, 42, 43, 44, 45, 46, 47, and 48 of the rotor 30 can be surely generated. Thus, the secondary magnet 52 can be fixed in a correct position, and the rotational position of the rotor 30 can be accurately detected accordingly.

(Second Embodiment)

A rotating electrical machine 2 according to a second embodiment of the present disclosure is described below with reference to FIG. 5. A difference between the first embodiment and the second embodiment is in a shape of a rotor.

The rotating electrical machine 2 is a reluctance motor including a salient-pole rotor 70 with no permanent magnet. The rotor 70 includes a boss portion 700, four projections 701, 703, 705, and 707 (as a first magnetic pole), and four recesses 702, 704, 706, and 708 (as a second magnetic pole). The projections 701, 703, 705, and 707 project from the boss portion 700 in a radial outward direction. Each of the recesses 702, 704, 706, and 708 is located between adjacent two of the projections 701, 703, 705, and 707, respectively. For example, the recess 702 is located between the projections 701 and 703.

Figure 5:
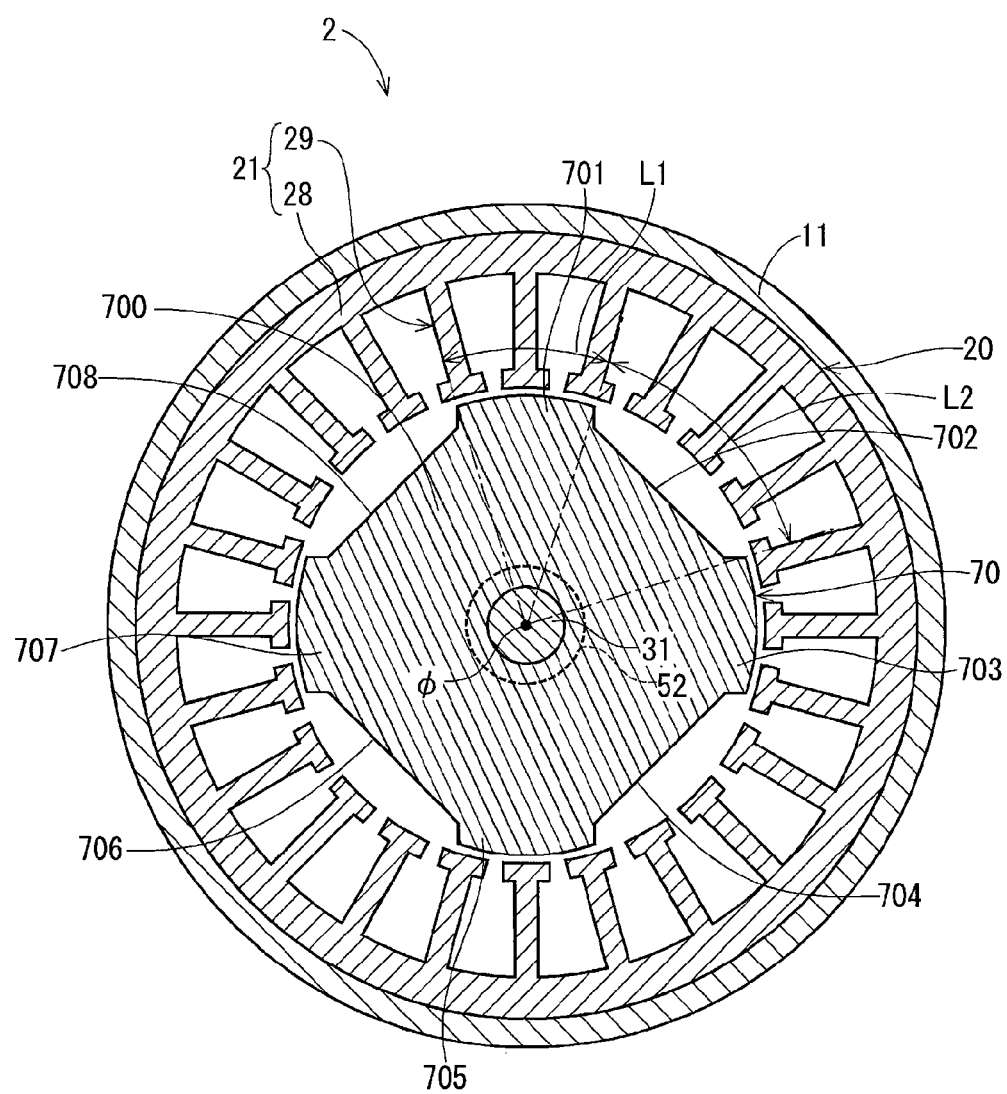
FIG. 5 is a diagram illustrating a cross-sectional view of a rotating electrical machine according to a second embodiment of the present disclosure.

As shown in FIG. 5, each of the projections 701, 703, 705, and 707 has a length L1 in a circumferential direction, and each of the recesses 702, 704, 706, and 708 has a length L2 in the circumferential direction. The length L1 is not greater than the length L2.

According to the second embodiment, a distance between a tip of the tooth portion 29 and each of the projections 701, 703, 705, and 707 in a radial inward direction is smaller than a distance between a tip of the tooth portion 29 and each of the recesses 702, 704, 706, and 708 in the radial inward direction. Thus, a magnetic reluctance becomes smaller between the tip of the tooth portion 29 and each of the projections 701, 703, 705, and 707 in the radial inward direction than between the tip of the tooth portion 29 and each of the recesses 702, 704, 706, and 708 in the radial inward direction. That is, the rotor 70 has magnetic projections and recesses. A position of the rotor 70 depends on a positional relationship between the tooth portion 29 and each of the projections 701, 703, 705, and 707 which allow a magnetic flux to pass through easily. Therefore, the rotor 70 can be accurately positioned in a predetermined position.

Further, according to the second embodiment, a magnetic circuit in the rotating electrical machine 2 is optimized by setting the length L1 to a value not greater than the length L2. Thus, the rotating electrical machine 2 can be reduced in size.

(Third Embodiment)

A rotating electrical machine 3 according to a third embodiment of the present disclosure is described below with reference to FIG. 6. A difference between the first embodiment and the third embodiment is in a shape of a rotor.

The rotating electrical machine 3 is a consequent-pole motor. A rotor 73 includes a boss portion 730, four projections 731, 733, 735, and 737 (as a first magnetic pole), four recesses 732, 734, 736, and 738, and four primary magnets

741, 742, 743, and 744 (as a second magnetic pole). The projections 731, 733, 735, and 737 project from the boss portion 730 in a radial outward direction. Each of the recesses 732, 734, 736, and 738 is located between adjacent two of the projections 731, 733, 735, and 737, respectively. For example, the recess 732 is located between the projections 731 and 733. The primary magnets 741, 742, 743, and 744 are placed on the recesses 732, 734, 736, and 738, respectively.

Each of the projections 731, 733, 735, and 737 is made from soft magnetic material and has one of a north pole and a south pole. Each of the primary magnets 741, 742, 743, and 744 has the other of a north pole and a south pole. For example, according to the third embodiment, each of the projections 731, 733, 735, and 737 has a south pole, and each of the primary magnets 741, 742, 743, and 744 has a north pole.

Figure 6:
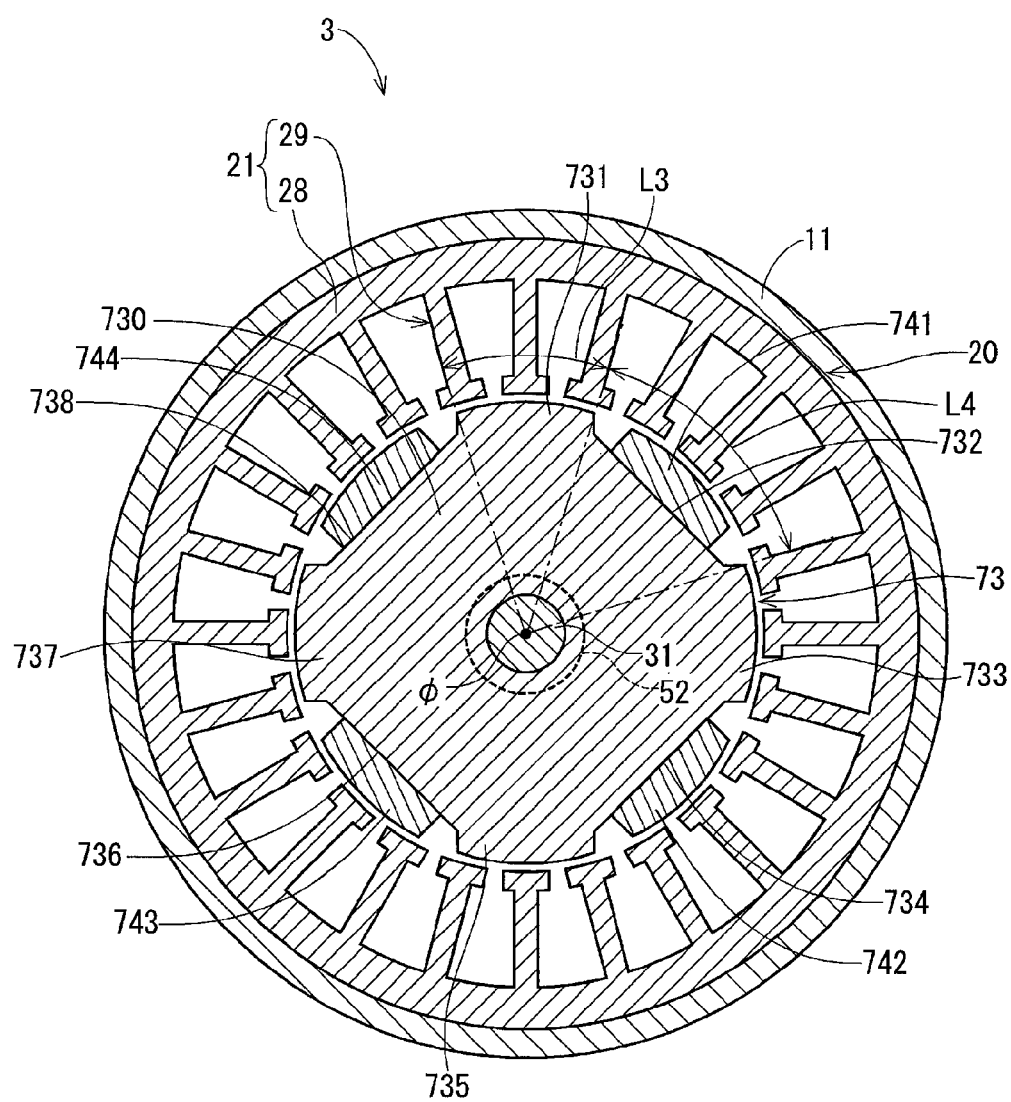
FIG. 6 is a diagram illustrating a cross-sectional view of a rotating electrical machine according to a third embodiment of the present disclosure.

As shown in FIG. 6, each of the projections 731, 733, 735, and 737 has a length L3 in a circumferential direction, and each of the recesses 732, 734, 736, and 738 has a length L4 in the circumferential direction. The length L3 is not greater than the length L4.

According to the third embodiment, the magnetic permeability of the projections 731, 733, 735, and 737 is greater than the magnetic permeability of the primary magnets 741, 742, 743, and 744. Thus, a magnetic reluctance becomes smaller between a tip of the tooth portion 29 and each of the projections 731, 733, 735, and 737 in the radial inward direction than between the tip of the tooth portion 29 and each of the primary magnets 741, 742, 743, and 744 in the radial inward direction. That is, the rotor 73 has magnetic projections and recesses. A position of the rotor 73 depends on a positional relationship between the tooth portion 29 and each of the projections 731, 733, 735, and 737 which allow a magnetic flux to pass through easily. Therefore, the rotor 73 can be accurately positioned in a predetermined position.

Further, according to the third embodiment, a magnetic circuit in the rotating electrical machine 3 is optimized by setting the length L3 to a value not greater than the length L4. Thus, the rotating electrical machine 3 can be reduced in size.

(Fourth Embodiment)

Figure 7:
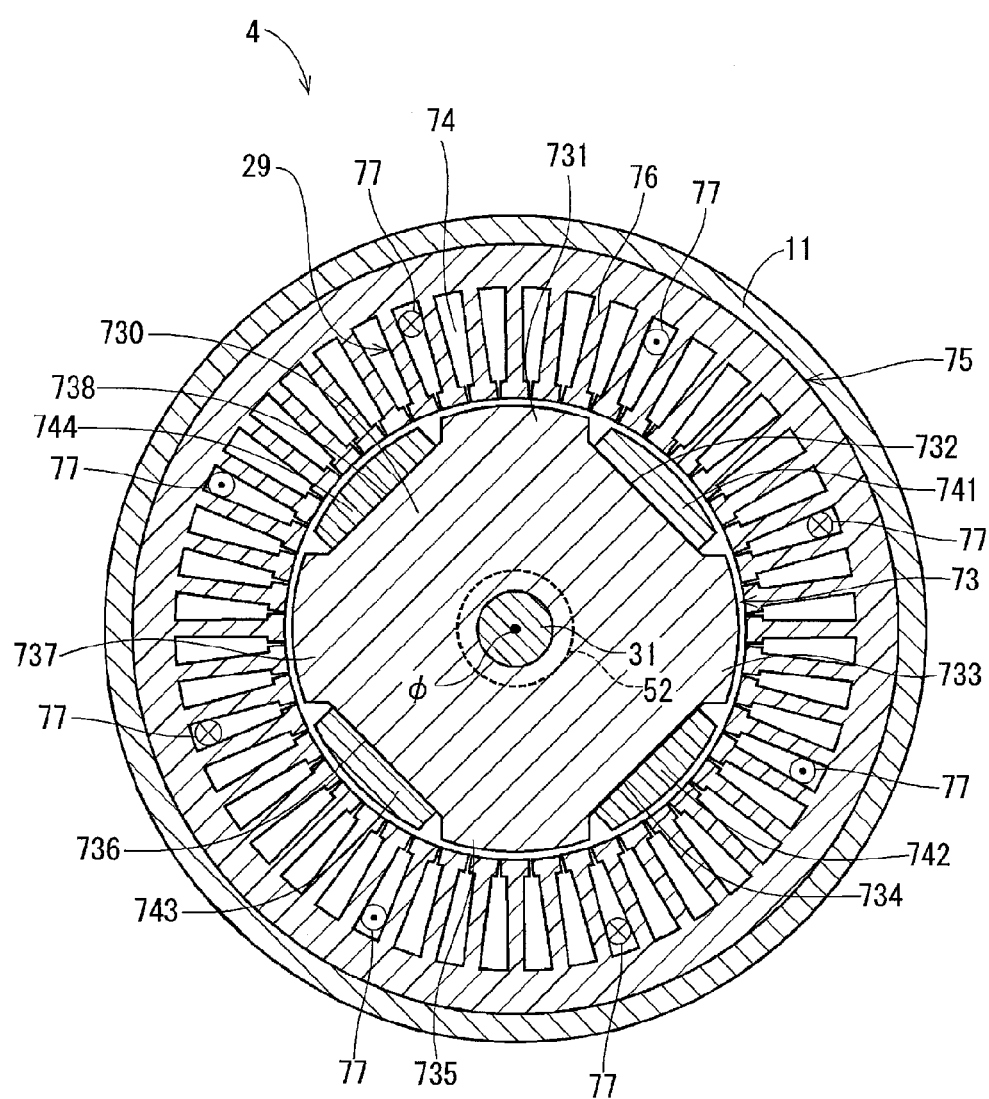
FIG. 7 is a diagram illustrating a cross-sectional view of a rotating electrical machine according to a fourth embodiment of the present disclosure.

A rotating electrical machine 4 according to a fourth embodiment of the present disclosure is described below with reference to FIG. 7. A difference between the third embodiment and the fourth embodiment is in the number of tooth portions of a stator.

The rotating electrical machine 4 is a three-phase, eight-pole brushless motor. A stator 75 has forty-eight tooth portions 76. In this case, a number k defined as the number of tooth portions 76 for every magnetic pole and every phase is two (=48/24).

A slot 74 is formed between adjacent tooth portions 76. A winding set 77 is wound in every sixth slot 74. That is, the winding set 77 is wound at intervals of six slots 74. In other words, the winding set 77 is wound at intervals of six tooth portions 76. The six tooth portions 76 providing each interval are positioned to face one primary magnet or one projection of the rotor 73. Thus, the winding set 77 is wound on the tooth portions 76 at intervals of an electrical angle of $\pi$ (i.e., 180°). It is noted that FIG. 7 shows a direction of an electric current flowing through a U-phase winding only.

In the rotating electrical machine 4, the number of tooth portions 76 for every magnetic pole pair is twelve. Thus, when the rotor 73 is positioned in a predetermined position with respect to the stator 75, each of the projections 731, 733, 735, and 737 of the rotor 73 is positioned to face the six tooth portions 76. Thus, the secondary magnet 52 can be fixed in a correct position with respect to the projections 731, 733, 735, and 737 and the primary magnets 741, 742, 743, and 744. Thus, the rotational position of the rotor 73 can be accurately detected.

(Fifth Embodiment)

Figure 8:
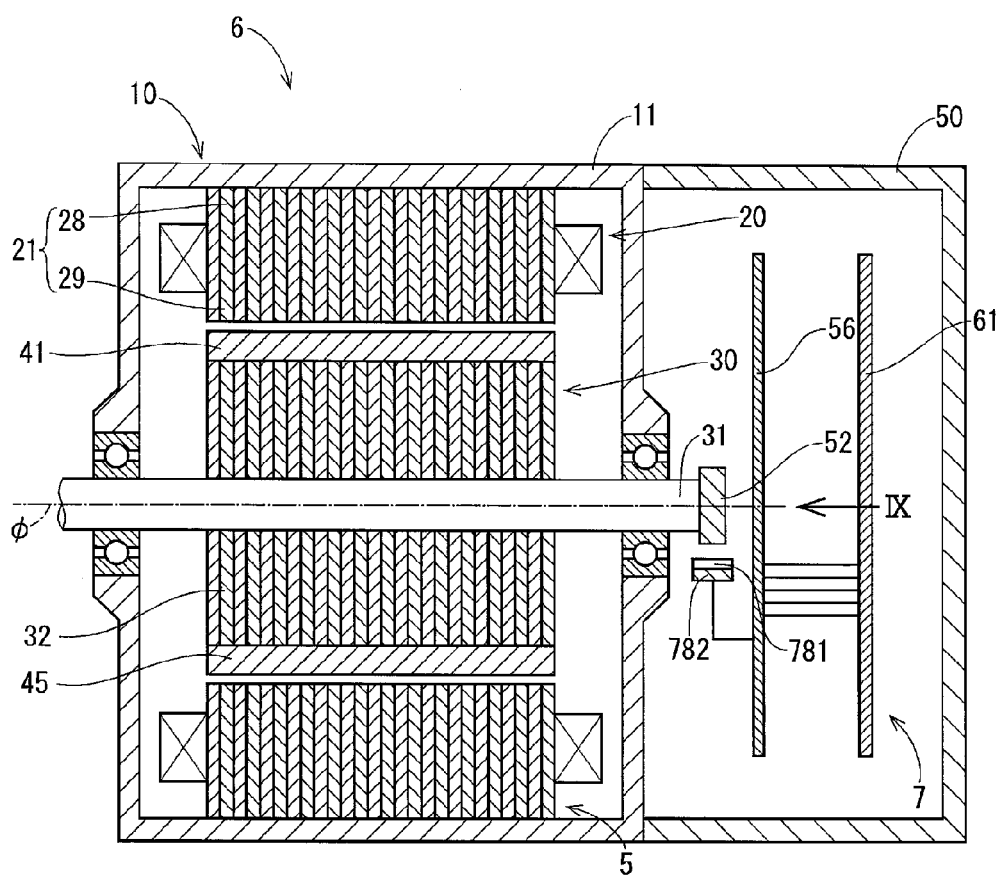
FIG. 8 is a diagram illustrating a cross-sectional view of a rotating electrical machine according to a fifth embodiment of the present disclosure.
Figure 9:
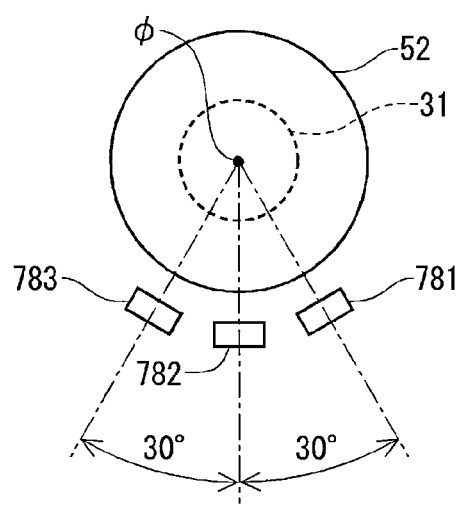
FIG. 9 is a diagram illustrating a view from an arrow IX in FIG. 8.

A rotating electrical machine 6 according to a fifth embodiment of the present disclosure is described below with reference to FIGS. 8 and 9. A difference between the first embodiment and the fifth embodiment is in a position where a magnetic sensor is fixed.

The rotating electrical machine 6 has three magnetic sensors 781, 782, and 783 (as a magnetic detector). The magnetic sensors 781, 782, and 783 are located in a radial direction of the secondary magnet 52. As shown in FIG. 9, the magnetic sensors 781, 782, and 783 are spaced from each other by an angle of 30° around the rotation axis Φ of the shaft 31. The magnetic sensor 781 has a Hall element and detects a magnetic field perpendicular to the magnetic sensor 781. The magnetic sensor 782 has a Hall effect element and detects a magnetic field perpendicular to the magnetic sensor 782. The magnetic sensor 783 has a Hall effect element and detects a magnetic field perpendicular to the magnetic sensor 783.

(Modifications)

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

(a) In the first, second, third, and fifth embodiments, the total number of tooth portions is twenty-four, and the number of tooth portions for every magnetic pole is three. In the fourth embodiment, the total number of tooth portions is forty-eight, and the number of tooth portions for every magnetic pole is six. The total number of tooth portions and the number of tooth portions for every magnetic pole are not limited to these numbers, as long as the number of tooth portions for every magnetic pole is even.

(b) In the embodiments, the rotating electrical machine is a three-phase brushless motor. The number of phases of the rotating electrical machine is not limited to three. For example, the number of phases of the rotating electrical machine can be two.

(c) In the embodiments, the rotating electrical machine has eight poles. The number of poles is not limited to eight. For example, the rotating electrical machine can have two poles.

(d) In the embodiments, the winding set is wound at intervals of an electrical angle of $\pi$ (i.e., 180°). The interval at which the winding set is wound is not limited to the electrical angle of $\pi$. For example, the winding set can be wound at intervals of an electrical angle smaller than $\{(2k+1) \times \pi/3k\}$, where k is the number of tooth portions for every magnetic pole and every phase.

(e) In the fifth embodiment, three magnetic sensors are located in a radial direction of the secondary magnet and spaced from each other by an angle of 30° around the rotation axis of the shaft. The number of magnetic sensors and the angle by which the magnetic sensors are spaced from each other are not limited to those of the fifth embodiment. For example, only one magnetic sensor can be located in a radial direction of the secondary magnet. For example, the magnetic sensors can be spaced from each other by an angle different from 30°.

What is claimed is:

1. A method of manufacturing a rotating electrical machine, the method comprising:
    preparing a stator core and a rotor, wherein the stator core includes a ring-shaped yoke held in a supporting member, tooth portions projecting from the yoke in a radial inward direction of the yoke, and a winding set wound on the tooth portions, wherein the rotor is located in the stator core and configured to rotate with a shaft, the shaft extending through the stator core and rotatably supported by the supporting member, wherein the number of the tooth portions for every magnetic pole pair in the rotor is even;
    assembling the stator core and the rotor inside of the supporting member, wherein an end of the shaft extends outside of the supporting member, and wherein the rotor rotates by flowing an electric current though the winding set:
    flowing an electric current through a winding of the winding set to keep the rotor in a predetermined position with respect to the stator core, wherein in said predetermined position, a center of a magnetic field generated by the winding of the winding set is positioned to face a center position of the magnetic pole in the rotor;
    fixing a magnetic generator to an end of the shaft white the rotor is kept in the predetermined position with, respect to the stator core; and
    providing a magnetic detector configured to output a signal indicative of a change in magnetic flux density created by the magnetic generator.

2. The method according to claim 1, wherein
    the winding set includes three phase windings, and
    each of the three phase windings is wound on the tooth portions at intervals of an electrical angle equal to or greater than $\{(2k+1)\times\pi/3k\}$, where k =(the total number of tooth portions in the stator core)/(3×the total number of magnetic poles in the rotor).

3. The method according to claim 2, wherein
    the number of the tooth portions for every magnetic pole in the rotor is equal to or greater than 3k−1.

4. The method according to claim 2, wherein:
    $(2k+1)\times\pi/3k$ is not $2\pi/3$.

5. The method according to claim 2, wherein:
    k is equal to or greater than 2.

6. The method according to claim 1, wherein
    the yoke and the tooth portions are formed as a single piece.

7. The method according to claim 1, wherein
    the magnetic pole pair includes a first magnetic pole and a second magnetic pole, and
    a magnetic reluctance of the first magnetic pole is smaller than a magnetic reluctance of the second magnetic pole.

8. The method according to claim 7, wherein
    the first magnetic pole has a first length in a circumferential direction of the rotor,
    the second magnetic pole has a second length in the circumferential direction, and
    the first length is not greater than the second length.

9. The method according to claim 1, wherein
    the magnetic detector has a magnetoresistive element located in an axis direction of the magnetic generator.

10. The method according to claim 1, wherein
    the magnetic detector has a Hall element located in a radial outward direction of the magnetic generator.

11. The method according to claim 1, further comprising:
    providing a processor configured to calculate a relative rotation angle of the rotor with respect to the stator core based on the signal outputted from the magnetic detector, and
    providing an energization controller configured to control an electric current flowing through the winding set based on the relative rotation angle.

12. The method according to claim 1, wherein:
    wherein the magnetic generator is fixed to the end of the shaft to generate a magnetic flux perpendicular to the shaft.

13. The method according to claim 1, wherein:
    wherein the magnetic generator is fixed to the end of the shaft in a casing and the casing is press fitted to the end of the shaft.

* * * * *